US012745036B2

(12) United States Patent
Liu

(10) Patent No.: US 12,745,036 B2
(45) Date of Patent: Sep. 22, 2026

(54) METHOD FOR PROCESSING SOUND SIGNAL, APPARATUS, DEVICE AND STORAGE MEDIUM

(71) Applicant: GOERTEK INC., Weifang (CN)

(72) Inventor: Jibin Liu, Weifang (CN)

(73) Assignee: GOERTEK INC., Weifang (CN)

( * ) Notice: Subject to any disclaimer, the term of this patent is extended or adjusted under 35 U.S.C. 154(b) by 127 days.

(21) Appl. No.: 18/805,708

(22) Filed: Aug. 15, 2024

(65) Prior Publication Data

US 2024/0406623 A1 Dec. 5, 2024

Related U.S. Application Data

(63) Continuation of application No. PCT/CN2022/102125, filed on Jun. 29, 2022.

(30) Foreign Application Priority Data

Apr. 22, 2022 (CN) ......................... 202210428083.9

(51) Int. Cl.
*H04R 3/00* (2006.01)

(52) U.S. Cl.
CPC ......... *H04R 3/005* (2013.01); *H04R 2410/05* (2013.01)

(58) Field of Classification Search
CPC ........ H04R 1/08; H04R 2410/05; H04R 3/00; H04R 3/005
See application file for complete search history.

(56) References Cited

U.S. PATENT DOCUMENTS

| | | | | |
|---|---|---|---|---|
| 8,705,783 B1 | 4/2014 | Mishra et al. | | |
| 11,328,702 B1 * | 5/2022 | Xiao | H04R 1/105 | |
| 2010/0111324 A1 * | 5/2010 | Yeldener | H04R 1/406 | 381/92 |
| 2012/0045068 A1 | 2/2012 | Kim et al. | | |
| 2012/0275620 A1 * | 11/2012 | Matsuo | H04R 3/005 | 381/92 |

(Continued)

FOREIGN PATENT DOCUMENTS

| | | |
|---|---|---|
| CN | 101281457 A | 10/2008 |
| CN | 105321510 A | 2/2016 |
| CN | 105704321 A | 6/2016 |

(Continued)

OTHER PUBLICATIONS

Communication and European Search Report issued in European Application No. 23777596.0; mailed Mar. 25, 2025; 8 pages.

(Continued)

*Primary Examiner* — Mainul Hasan
(74) *Attorney, Agent, or Firm* — HAUPTMAN HAM, LLP

(57) ABSTRACT

Disclosed are a method and an apparatus for processing a sound signal, an audio device and a storage medium. The method including: determining a current array state of the microphone array, the current array state represents whether a microphone in the microphone array is currently in a normal working state; and calling a target processing parameter in the current array state from signal processing parameters in multiple array states preset corresponding to a normal microphone to process a sound signal picked up by the normal microphone, the normal microphone is a microphone in a normal working state in the microphone array.

7 Claims, 7 Drawing Sheets

(56) References Cited

U.S. PATENT DOCUMENTS

| | | | |
|---|---|---|---|
| 2013/0343560 A1 | 12/2013 | Liu et al. | |
| 2022/0053283 A1 | 2/2022 | Beaurepaire et al. | |

FOREIGN PATENT DOCUMENTS

| | | | | |
|---|---|---|---|---|
| CN | 105959842 A | | 9/2016 | |
| CN | 106303804 A | | 1/2017 | |
| CN | 106686494 A | | 5/2017 | |
| CN | 106775322 A | | 5/2017 | |
| CN | 106911996 A | | 6/2017 | |
| CN | 206489876 U | | 9/2017 | |
| CN | 110392334 A | * | 10/2019 | ........... H04R 29/005 |
| CN | 111341345 A | | 6/2020 | |
| CN | 111918196 A | | 11/2020 | |
| CN | 113132846 A | | 7/2021 | |
| CN | 113766409 A | * | 12/2021 | ........... H04R 29/005 |
| CN | 114125624 A | | 3/2022 | |
| CN | 114708884 A | | 7/2022 | |
| JP | 2020505648 A | | 2/2020 | |
| WO | 2020019843 A1 | | 1/2020 | |
| WO | 2020237953 A1 | | 12/2020 | |
| WO | 2021019844 A1 | | 2/2021 | |
| WO | 2023201886 A1 | | 10/2023 | |

OTHER PUBLICATIONS

First Office Action in Corresponding Chinese Application No. 202210428083.9, dated Mar. 26, 2024; 21 pgs.

Grant Notice in Corresponding Chinese Application No. 202210428083.9, dated Nov. 30, 2020; 3 pgs.

International Search Report and Written Opinion in Corresponding International Application No. PCT/CN2022/102125, mailed Jan. 12, 2023; 13 pgs.

* cited by examiner

METHOD FOR PROCESSING SOUND SIGNAL, APPARATUS, DEVICE AND STORAGE MEDIUM

CROSS-REFERENCE TO RELATED APPLICATIONS

This application is a continuation application of International Application No. PCT/CN2022/102125, filed on Jun. 29, 2022, which claims priority to Chinese Patent Application No. 202210428083.9, filed on Apr. 22, 2022. The disclosures of the above-mentioned applications are incorporated herein by reference in their entireties.

TECHNICAL FIELD

The present application relates to the technical field of microphone, and in particular to a method and an apparatus for processing a sound signal, an audio device and a storage medium.

BACKGROUND

Common audio devices nowadays generally have microphone arrays including multiple microphones. For example, a Bluetooth earphone is equipped with no less than two microphones, and a call bracelet is equipped with at least two microphones. When using a multi-microphone audio device, improper use by the user may cause some of the microphones in the microphone array to be damaged, or some of the microphones in the microphone array may malfunction. The damaged or malfunctioning microphone in the microphone array is in a failed working state, and the microphone array is in an abnormal array state. When the microphone array is in an abnormal array state, the sound finally output by the audio device is significantly different from when the microphone array is in a normal state, resulting in a poor user experience when using the audio device.

The above contents are only used to assist in understanding the technical solution of the present application and do not constitute an admission that the above contents are prior art.

SUMMARY

The main objective of the present application is to provide a method for processing a sound signal, which aims to solve the technical problem of degraded user experience when some microphones in the microphone array of the audio device are in a failed working state.

In order to achieve the above objective, the present application provides a method for processing a sound signal, including the following steps:

- determining a current array state of the microphone array, the current array state represents whether a microphone in the microphone array is currently in a normal working state; and
- calling a target processing parameter in the current array state from signal processing parameters in multiple array states preset corresponding to a normal microphone to process a sound signal picked up by the normal microphone, the normal microphone is a microphone in a normal working state in the microphone array In an embodiment, the calling the target processing parameter in the current array state from signal processing parameters in multiple array states preset corresponding to the normal microphone to process the sound signal picked up by the normal microphone includes:

- calling a target gain parameter in the current array state from the gain parameters preset in multiple array states corresponding to the normal microphone performing the call function, and performing a gain process on the sound signal picked up by the normal microphone.

In an embodiment, the calling the target processing parameter in the current array state from signal processing parameters in multiple array states preset corresponding to the normal microphone to process the sound signal picked up by the normal microphone includes:

- calling a target filter parameter in the current array state from filter parameters in multiple array states preset corresponding to the normal microphone performing noise reduction function, and performing a noise reduction process on the sound signal picked up by the normal microphone.

In an embodiment, the calling the target processing parameter in the current array state from signal processing parameters in multiple array states preset corresponding to the normal microphone to process the sound signal picked up by the normal microphone includes:

- calling the target processing parameter in the current array state from the signal processing parameters in multiple array states preset corresponding to a function currently performed by the normal microphone, and performing a process corresponding to the function currently performed by the normal microphone on the sound signal picked up by the normal microphone.

In an embodiment, the calling the target processing parameter in the current array state from the signal processing parameters in multiple array states preset corresponding to the function currently performed by the normal microphone, and performing the process corresponding to the function currently performed by the normal microphone on the sound signal picked up by the normal microphone includes:

- in response to detecting that the audio device is not in a call function, configuring the normal microphone as an active noise reduction microphone to perform an active noise reduction function; and
- calling a target active noise reduction parameter in the current array state, and performing an active noise reduction process on the sound signal picked up by the active noise reduction microphone from active noise reduction parameters in multiple array states preset corresponding to the active noise reduction function of the active noise reduction microphone, the active noise reduction parameters are the filter parameters corresponding to the microphone performing the active noise reduction function.

In an embodiment, in response to that a quantity of the normal microphones is two, the calling the target processing parameter in the current array state from the signal processing parameters in multiple array states preset corresponding to the function currently performed by the normal microphone, and performing the process corresponding to the function currently performed by the normal microphone on the sound signal picked up by the normal microphone includes:

- in response to detecting that the audio device is in a call state, configuring one of the normal microphones as a call microphone to perform a call function, and configuring another one of the normal microphones as an active noise reduction microphone to perform an active noise reduction function;

calling the target gain parameter in the current array state, and performing the gain process on the sound signal picked up by the call microphone from the gain parameters in the multiple array states preset corresponding to the call function of the call microphone; and calling the target active noise reduction parameter in the current array state from the active noise reduction parameters in the multiple array states preset corresponding to the active noise reduction function of the active noise reduction microphone, and performing the active noise reduction process on the sound signal picked up by the active noise reduction microphone.

In an embodiment, the determining the current array state of the microphone array includes:

obtaining an amplitude of the sound signal picked up by the microphone in the microphone array, and comparing the amplitude with a preset amplitude range;

in response to that the amplitude is not within the amplitude range, determining that the microphone in the microphone array is not in the normal working state;

in response to that the amplitude is within the amplitude range, determining that the microphone in the microphone array is in the normal working state; and determining the current array state of the microphone array according to whether the microphone in the microphone array is currently in the normal working state.

In order to achieve the above objective, the present application further provides an apparatus for processing a sound signal, including: a determination module, and a processing module.

The determination module is configured to determine a current array state of a microphone array, the current array state represents whether the microphone in the microphone array is currently in a normal working state.

The processing module is configured to call a target processing parameter in the current array state from signal processing parameters in multiple array states preset corresponding to a normal microphone to process a sound signal picked up by the normal microphone, the normal microphone is a microphone in a normal working state in the microphone array.

In order to achieve the above objective, the present application further provides an audio device, including: a memory, a processor, and a program for processing a sound signal stored in the memory and executable on the processor, the program for processing the sound signal implements the steps of the method for processing the sound signal described above when executed by the processor.

In addition, in order to achieve the above objective, the present application further provides a computer-readable storage medium, on which a program for processing a sound signal is stored. When the program for processing the sound signal is executed by a processor, the method for processing the sound signal described above are implemented.

In the present application, a microphone array including at least two microphones is provided on an audio device to determine the current array state of the microphone array, the current array state represents whether the microphone in the microphone array is currently in a normal working state, and the target processing parameters in the current array state are called from the signal processing parameters in multiple array states preset corresponding to the normal microphones to process the sound signals picked up by the normal microphones. The normal microphones are microphones in the microphone array in a normal working state. The present application realizes that when some microphone in the microphone array is in a failed working state, the sound finally output by the audio device when the microphone array is in an abnormal array state is close to the sound signal output when the microphone array is in a normal array state, thereby improving the user's experience of using the audio device.

The realization of the purpose, functional features and advantages of the present application will be further described with reference to the embodiments and the accompanying drawings.

DETAILED DESCRIPTION OF THE EMBODIMENTS

It should be understood that the specific embodiments described herein are only used to explain but not to limit the present application.

Figure 1:
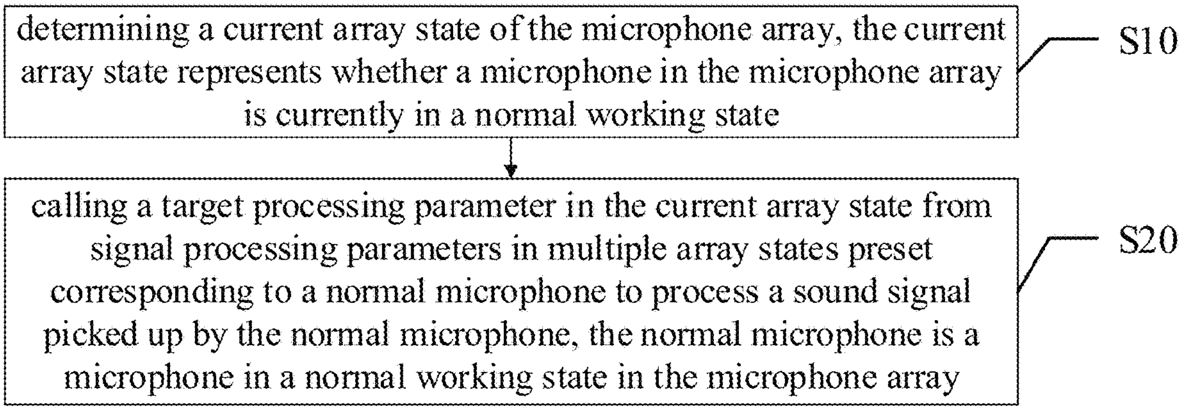
FIG. 1 is a flowchart of a method for processing a sound signal according to an embodiment of the present application.

An embodiment of the present application provides a method for processing a sound signal. As shown in FIG. 1, which is a flowchart of a method for processing a sound signal according to an embodiment of the present application. It should be noted that, although a logical order is shown in the flowchart, in some cases, the steps shown or described may be performed in an order different from that shown here. In an embodiment, the method for processing the sound signal is applied to an audio device, and a microphone array including at least two microphones is provided on the audio device. The method for processing the sound signal includes:

Step S10, determining a current array state of the microphone array, the current array state represents whether a microphone in the microphone array is currently in a normal working state.

During the use of a multi-microphone audio device, due to human or microphone apparatus failures, the user's experience of using the audio device deteriorates. The embodiment provides a method for processing a sound signal. When some microphones in a microphone array fail, corresponding signal processing parameters are called from normal microphones to process the sound signals picked up by the normal microphones, so that the sound signals obtained after processing are close to the sound signals when the microphone array is in a normal state, thereby improving the user's experience when using the audio device.

A device that can acquire, transmit, process, and output sound signals is called an audio device. Multiple microphones provided on an audio device form a microphone array. When a microphone can output a sound signal to the corresponding sound signal processing path, it means that the microphone is in a normal working state, and a microphone in a normal working state is referred to as a normal microphone. When a microphone cannot output a sound signal to the corresponding sound signal processing path, it means that the microphone is not in a normal working state, that is, the microphone is in a failed working state, and a microphone in a failed working state is referred to as a failed microphone. The array state of the microphone array is configured to represent whether each microphone in the microphone array is in a normal working state. For example, a microphone array including a first microphone and a second microphone, in which the first microphone is in a normal working state and the second microphone is not in a normal working state (that is, a failed working state), the array state of the microphone array is: the first microphone is in a normal working state and the second microphone is in a failed working state. The array state of the microphone array at the current moment is referred to as the current array state for distinction. When each microphone in the microphone array is in a normal working state, the current array state of the microphone array is referred to as the normal array state.

In an embodiment, after determining whether each microphone in the microphone array is currently in a normal working state, the current array state of the microphone array is configured for characterization.

Step S20, calling a target processing parameter in the current array state from signal processing parameters in multiple array states preset corresponding to a normal microphone to process a sound signal picked up by the normal microphone, the normal microphone is a microphone in a normal working state in the microphone array.

In an audio device, the sound signal picked up by the microphone needs to be processed and then output. The parameters configured to process the sound signal are called signal processing parameters. The functions performed by the microphone are different, and the signal processing parameters are also different. In an embodiment, the function performed by the microphone is not limited. For example, in an embodiment, the microphone performs a call function, and the corresponding signal processing parameter is a gain parameter. In another embodiment, the microphone performs a noise reduction function, and the corresponding signal processing parameter is a filter parameter. In an embodiment, each microphone in the microphone array can perform the same function or different functions, which is not limited in the embodiment.

Different signal processing parameters are set in advance for each microphone in the microphone array, and one microphone is set with signal processing parameters in multiple array states to cope with different array states that may occur in the microphone array. The signal processing parameters in different array states are determined according to the sound signals processed in multiple array states and the sound signals processed in the normal array state, and the effect of the sound signal processed by the signal processing parameters in the corresponding array state is close to the sound signal processed in the normal array state. For example, in an embodiment, the microphone performs a call function, and the sound signal obtained after gain process using the gain parameters in the corresponding array state has the same loudness as the sound signal processed in the normal array state. In another embodiment, the microphone performs a noise reduction function, and the amplitude of the sound signal after noise reduction processing using the filter parameters in the corresponding array state is close to the amplitude of the sound signal obtained after noise reduction processing in the normal array state.

After determining the current array state of the microphone array, the sound signals of each normal microphone in the microphone array can be processed. Specifically, for a normal microphone, the target processing parameters in the current array state can be called from the signal processing parameters in various preset array states corresponding to the normal microphone.

For example, in an embodiment, a microphone array includes a first microphone and a second microphone, for the first microphone, a signal processing parameter when the microphone array is in a normal array state and a signal processing parameter when the first microphone is in a normal working state but the second microphone is in a failed working state are preset. When the current array state is the normal array state, the signal processing parameter set for the first microphone in the normal array state is used as the target processing parameter, and the target processing parameter is called to process the sound signal picked up by the first microphone. When the current array state is the array state in which the first microphone is in a normal working state and the second microphone is in a failed working state, the signal processing parameter set for the first microphone when the first microphone is in a normal working state and the second microphone is in a failed working state is used as the target processing parameter, and the target processing parameter is called to process the sound signal picked up by the first microphone. It can be understood that the processing method of the second microphone refers to the first microphone.

It should be noted that when some of the microphones in the microphone array are in a failed working state, the target processing parameters corresponding to the current array state are called from the preset signal processing parameters of the normal microphones to process the sound signals picked up by the normal microphones, so that the processed sound signals are close to the sound signals obtained when the microphone array is in a normal array state, thereby improving the user's experience when using the audio device.

Figure 2:
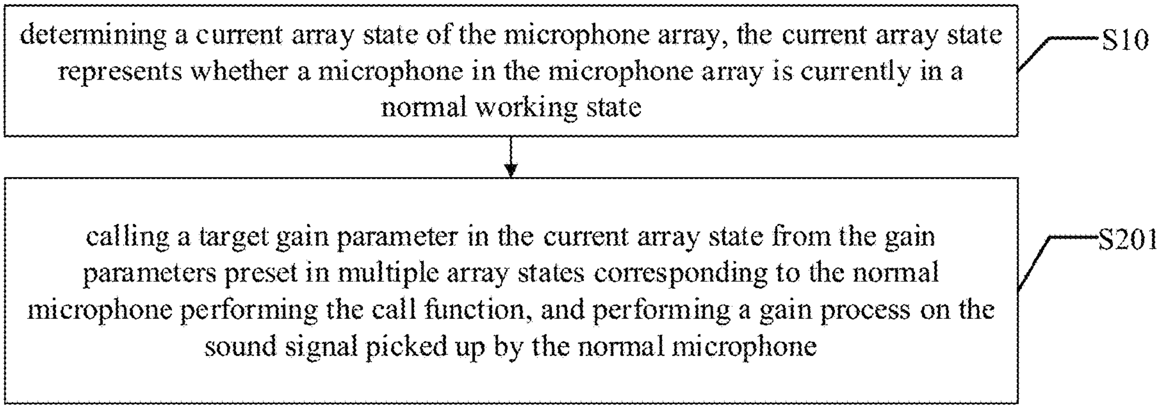
FIG. 2 is a flowchart of the method for processing the sound signal according to an embodiment of the present application.

Further, in an embodiment, as shown in FIG. 2, the step S20 includes:

Step S201, calling a target gain parameter in the current array state from the gain parameters preset in multiple array states corresponding to the normal microphone performing the call function, and performing a gain process on the sound signal picked up by the normal microphone.

The sound signal picked up by the microphone configured to perform the call function is called a call voice signal. The call voice signal picked up by the microphone performing the call function is gain processed using a gain parameter.

Figure 3:
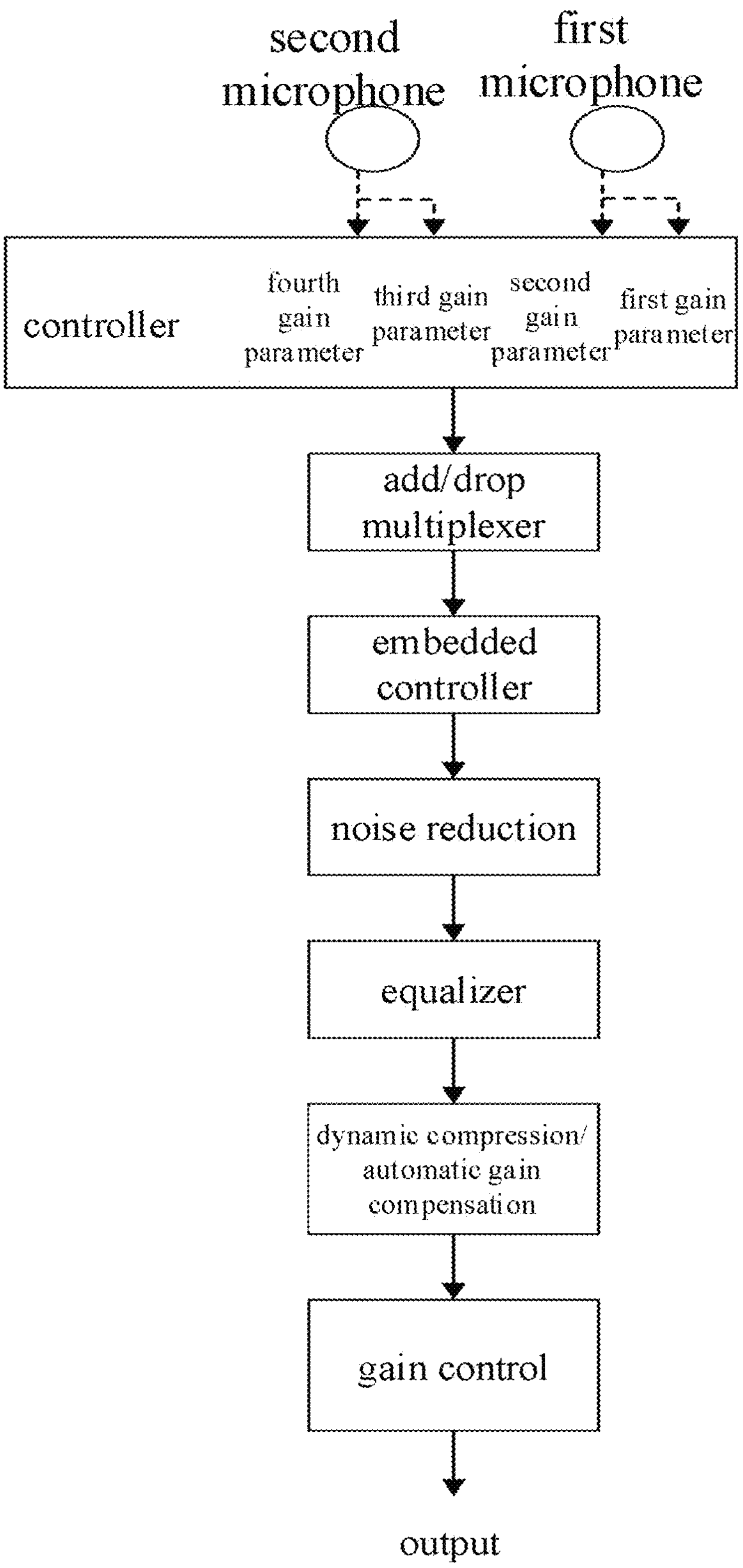
FIG. 3 is a flowchart of the method for processing the sound signal according to an embodiment of the present application.

The gain process may include noise reduction, dynamic compression, and other processing of the call voice signal, and may also include other processes that can process the call voice signal, which are not specifically limited in the embodiment. The signal processing parameters configured for noise reduction, dynamic compression, and other processing of the call voice signal are called gain parameters. Different array states correspond to different preset gain parameters, and the gain parameters in the current array state are called target gain parameters. Specifically, as shown in FIG. 3, in an embodiment, two microphones in the microphone array perform a call function. The target gain parameters in the current array state corresponding to the microphones are called by the controller, and the target gain parameters are configured to adjust the timbre of the call voice signal picked up by the corresponding microphone, and the voice signal after the timbre adjustment is processed by voice noise reduction, dynamic compression, or automatic gain compensation, and gain control and then output.

From the gain parameters of multiple array states preset corresponding to the normal microphone performing the call function, the target gain parameter in the current array state is called to perform gain process on the call voice signal picked up by the normal microphone. In an embodiment, as shown in FIG. 3, gain parameter 1 and gain parameter 2 are preset in the first microphone, gain parameter 1 is a signal processing parameter when both the first microphone and the second microphone are normal microphones, and gain parameter 2 is a signal processing parameter when the first microphone is a normal microphone but the second microphone is a failed microphone. Gain parameter 3 and gain parameter 4 are preset in the second microphone, gain parameter 3 is a signal processing parameter when both the first microphone and the second microphone are normal microphones, and gain parameter 4 is a signal processing parameter when the first microphone is a failed microphone but the second microphone is a normal microphone.

When both microphones are normal, gain parameter one is called to process the sound signal picked up by the first microphone and then output it, and gain parameter three is called to process the sound signal picked up by the second microphone and then output it. When the first microphone is in a failed working state, gain parameter four is called to process the sound signal picked up by the second microphone and then output it. When the second microphone is in a failed working state, gain parameter two is called to process the sound signal picked up by the first microphone and then output it.

It should be noted that, in an embodiment, the sound signal picked up by the normal microphone is processed using the target processing parameters in the current array state, so that the loudness of the sound signal obtained after processing is consistent with that in the normal array state, thereby ensuring the user's experience of using the audio device.

Figure 4:
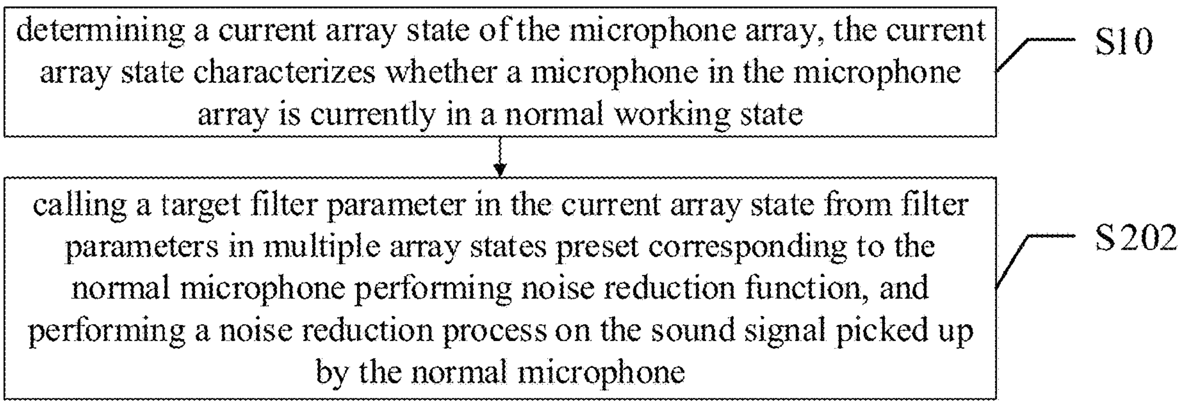
FIG. 4 is a flowchart of the method for processing the sound signal according to an embodiment of the present application.

Further, in an embodiment, as shown in FIG. 4, the step S20 includes:

Step S202, calling a target filter parameter in the current array state from filter parameters in multiple array states preset corresponding to the normal microphone performing noise reduction function, and performing a noise reduction process on the sound signal picked up by the normal microphone.

The signal processing parameters configured to perform noise reduction processing on the sound signal are called filter parameters. The noise reduction processing can be filtering the sound signal through a filter, or can be generating a signal with the same amplitude and opposite phase as the sound signal through a filter to offset the noise reduction of the sound signal. Different array states correspond to different preset filter parameters, and the filter parameters in the current array state are called target filter parameters.

The target filter parameters in the current array state are called from the filter parameters in various preset array states corresponding to the normal microphones that perform the noise reduction function, and the noise reduction process is performed on the sound signals picked up by the normal microphones.

Figure 5:
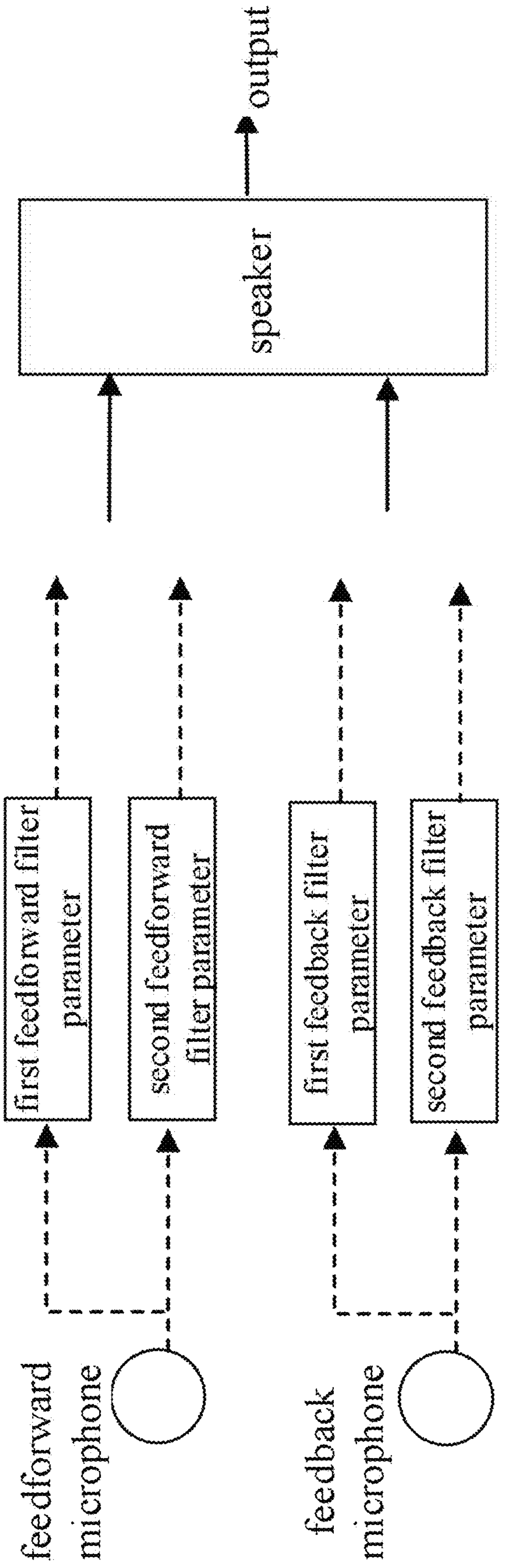
FIG. 5 is a flowchart of the method for processing the sound signal according to an embodiment of the present application.

As shown in FIG. 5, in an embodiment, a microphone array consisting of a feedforward microphone and a feedback microphone performs an active hybrid noise reduction function. In an embodiment, a first feedforward filter parameter and a second feedforward filter parameter are preset in the feedforward microphone, the first feedforward filter parameter is a signal processing parameter when the feedforward microphone and the feedback microphone are both normal microphones, and the second feedforward filter parameter is a signal processing parameter when the feedforward microphone is a normal microphone but the feedback microphone is a failed microphone. A first feedback filter parameter and a second feedback filter parameter are preset in the feedback microphone, the first feedback filter parameter is a signal processing parameter when the feedforward microphone and the feedback microphone are both normal microphones, and the second feedback filter parameter is a signal processing parameter when the feedforward microphone is a failed microphone but the feedback microphone is a normal microphone.

When both microphones are normal microphones, the sound signal picked up by the feedforward microphone is processed by second feedforward filter parameter and then output by a speaker, and the sound signal picked up by the feedback microphone is processed by first feedback filter parameter and then output by a speaker. When the feedforward microphone is in a failed working state, the sound signal picked up by the feedback microphone is processed by second feedback filter parameter and then output by a speaker. When the feedback microphone is in a failed working state, the sound signal picked up by the feedforward microphone is processed by second feedforward filter parameter and then output by a speaker.

It should be noted that the embodiment performs noise reduction processing on the sound signal picked up by the normal microphone by calling the filter parameters in the current array state corresponding to the normal microphone, thereby ensuring that the sound signal obtained after the noise reduction processing is close to the sound signal obtained by the noise reduction processing in the normal array state, thereby improving the user's experience when using the audio device.

In an embodiment, by determining the current array state of the microphone array, the target processing parameters in the current array state are called from the signal processing parameters corresponding to the normal microphones in various preset array states to process the sound signals picked up by the normal microphones. This ensures that when some microphones in the microphone array are in a failed working state, the sound signal ultimately output by the audio device when the microphone array is in an abnormal array state is close to the sound signal output when the microphone array is in a normal array state, thereby improving the user's experience of using the audio device.

Figure 6:
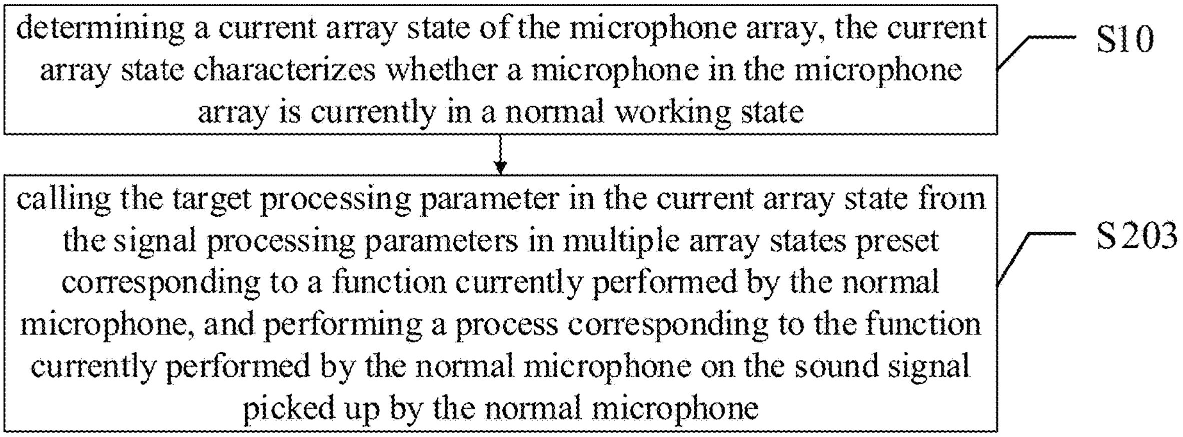
FIG. 6 is a flowchart of the method for processing the sound signal according to an embodiment of the present application.

An embodiment of the method for processing the sound signal of the present application is further provided. In the embodiment, as show in FIG. 6, the step S20 includes:

Step S203, calling the target processing parameter in the current array state from the signal processing parameters in multiple array states preset corresponding to a function currently performed by the normal microphone, and performing a process corresponding to the function currently performed by the normal microphone on the sound signal picked up by the normal microphone.

Each microphone in the microphone array can perform one function or multiple functions. The microphones are preset with signal processing parameters corresponding to the multiple functions in different array states. The signal processing parameters corresponding to the functions performed by the microphones in the current array state are called target processing parameters. In an embodiment, there is no restriction on the functions that the microphones can perform. For example, the microphones can perform one of the call function and the active noise reduction function, or both of the call function and the active noise reduction function.

From the signal processing parameters in the multiple array states preset corresponding to the functions currently performed by the normal microphone, the target processing parameters in the current array state are called to process the sound signal picked up by the normal microphone corresponding to the function currently performed by the normal microphone.

In an embodiment, by calling the target processing parameters in the current array state from the normal microphones in the microphone array that can perform multiple functions, the sound signals picked up by the normal microphones are processed corresponding to the currently executed functions, thereby ensuring the normal execution of various functions of the audio device and ensuring the user's experience when using the audio device.

Figure 7:
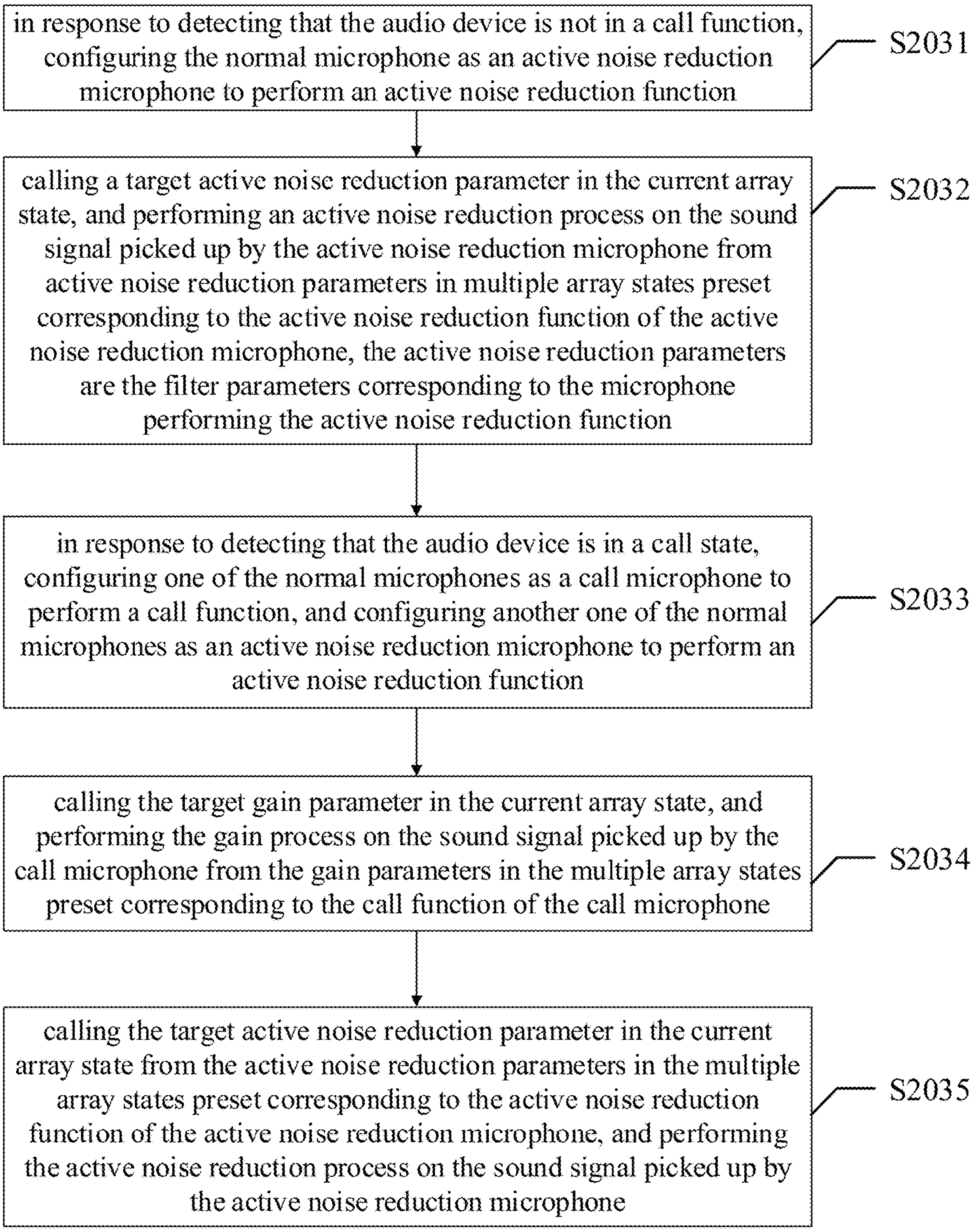
FIG. 7 is a flowchart of the method for processing the sound signal according to an embodiment of the present application.

Further, in an embodiment, as shown in FIG. 7, the step S203 includes:

Step S2031, in response to detecting that the audio device is not in a call function, configuring the normal microphone as an active noise reduction microphone to perform an active noise reduction function.

In an embodiment, the microphone can perform the active noise reduction function and the call function, or can perform the active noise reduction function, the call function and other functions. The microphones are preset with signal processing parameters corresponding to various functions in different array states. For example, for microphones that can perform the active noise reduction function and the call function, active noise reduction parameters corresponding to the active noise reduction function and gain parameters corresponding to the call function are preset.

The process of processing the external noise signal picked up by the microphone to generate an anti-phase sound signal with the same amplitude as the external noise signal, neutralizing the external noise signal, and making the user unable to hear the external noise is called active noise reduction. The filter parameters configured for active noise reduction are called active noise reduction parameters, and the normal microphone that performs the active noise reduction function is called an active noise reduction microphone.

When it is detected that the audio device is not in a call state, the normal microphone is determined to be an active noise reduction microphone to perform an active noise reduction function.

Step S2032, calling a target active noise reduction parameter in the current array state, and performing an active noise reduction process on the sound signal picked up by the active noise reduction microphone from active noise reduction parameters in multiple array states preset corresponding to the active noise reduction function of the active noise reduction microphone, the active noise reduction parameters are the filter parameters corresponding to the microphone performing the active noise reduction function.

When a normal microphone is used as an active noise reduction microphone to perform an active noise reduction function, the target active noise reduction parameters in the current array state are called from the active noise reduction parameters in the multiple array states preset corresponding to the active noise reduction function of the active noise reduction microphone, and active noise reduction process is performed on the sound signal picked up by the active noise reduction microphone.

It should be noted that by calling the active noise reduction parameters corresponding to a normal microphone to perform active noise reduction process on the picked up sound signal, the external environmental noise can be eliminated, allowing the user to hear clearer sound signals without noise interference, thereby improving the user's comfort when using the audio device.

Further, in an embodiment, when the quantity of the normal microphones is two, the step S203 includes:

Step S2033, in response to detecting that the audio device is in a call state, configuring one of the normal microphones as a call microphone to perform a call function, and configuring another one of the normal microphones as an active noise reduction microphone to perform an active noise reduction function.

In an embodiment, when the quantity of normal microphones in the microphone array is two, each microphone can be configured to perform a call function and an active noise reduction function.

When it is detected that the audio device is in a call state, one of the two normal microphones is determined to perform a call function, which is called a call microphone for distinction, and another one of the microphone is determined to perform an active noise reduction function, which is called an active noise reduction microphone for distinction. In an embodiment, when the two normal microphones are both feedback microphones, the two feedback microphones are not set with gain parameters and are not configured to perform the call function.

Step S2034, calling the target gain parameter in the current array state, and performing the gain process on the sound signal picked up by the call microphone from the gain parameters in the multiple array states preset corresponding to the call function of the call microphone.

From the gain parameters in the multiple array states preset corresponding to the call functions of the call microphone, the target gain parameter in the current array state is called to perform gain process on the sound signal picked up by the call microphone.

Step S2035, calling the target active noise reduction parameter in the current array state from the active noise reduction parameters in the multiple array states preset corresponding to the active noise reduction function of the active noise reduction microphone, and performing the active noise reduction process on the sound signal picked up by the active noise reduction microphone.

From the active noise reduction parameters in the multiple array states preset corresponding to the active noise reduction function of the active noise reduction microphone, the target active noise reduction parameters in the current array state are called to perform active noise reduction process on the sound signal picked up by the active noise reduction microphone.

It should be noted that, in an embodiment, when it is detected that the audio device is in a call state, one of the normal microphones is determined to perform the call function. The other is determined to perform the active noise reduction function, so that the sound signals obtained after processing the microphone array in different array states and in the normal array state are similar, which can prevent the user from being disturbed by external noise signals during the call, ensure that the user hears clear call voice, and ensure the user's experience of using the audio device.

Figure 8:
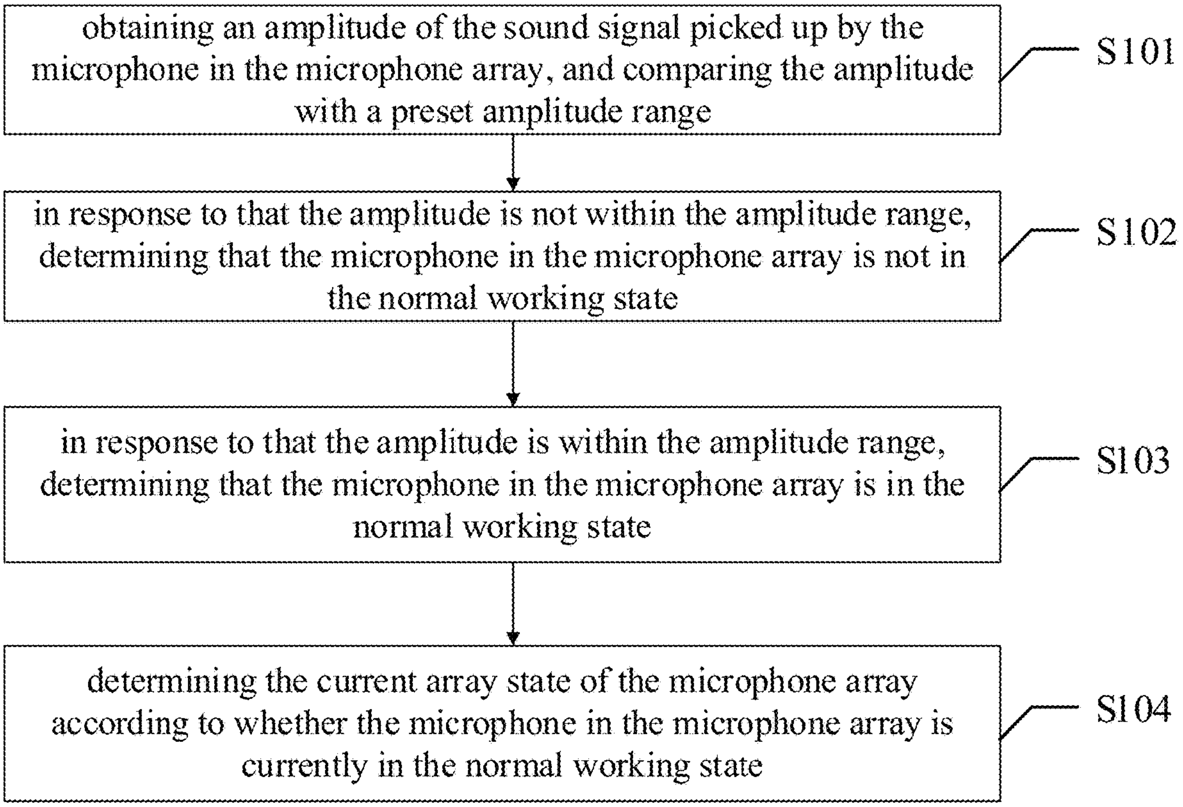
FIG. 8 is a flowchart of the method for processing the sound signal according to an embodiment of the present application.

An embodiment of the method for processing the sound signal of the present application is further provided. As shown in FIG. 8, in the embodiment, the step S10 includes:

Step S101, obtaining an amplitude of the sound signal picked up by the microphone in the microphone array, and comparing the amplitude with a preset amplitude range.

The current array state is configured to indicate whether each microphone in the microphone array is currently in a normal working state. Whether the microphone is currently in a normal working state can be determined by the amplitude of the sound signal picked up by the microphone or by whether the microphone can transmit the sound signal.

In an embodiment, whether the microphone is in a normal working state is judged by the amplitude of the sound signal picked up by the microphone. The amplitude of the sound signal picked up by the microphone in the microphone array is obtained, and the amplitude is compared with a preset amplitude range, the preset amplitude range when the microphone is in a normal working state is called a preset amplitude range.

Step S102, in response to that the amplitude is not within the amplitude range, determining that the microphone in the microphone array is not in the normal working state.

When the amplitude of the sound signal picked up by the microphone is not within the preset amplitude range, it is determined that the microphone in the microphone array is not in a normal working state, that is, the microphone is in a failed working state and is a failed microphone.

Step S103, in response to that the amplitude is within the amplitude range, determining that the microphone in the microphone array is in the normal working state.

When the amplitude of the sound signal picked up by the microphone is within a preset amplitude range, it is determined that the microphone in the microphone array is in a normal working state, that is, the microphone is a normal microphone.

Step S104, determining the current array state of the microphone array according to whether the microphone in the microphone array is currently in the normal working state.

The current array state of the microphone array is determined according to whether each microphone in the microphone array is currently in a normal working state.

In an embodiment, by determining whether the microphone is currently in a normal working state and clarifying the current array state of the microphone array, the audio device can call the signal processing parameters corresponding to the current array state to process the sound signal picked up by the normal microphone. This ensures that the sound signal processed by the microphone array in different array states is close to the sound signal processed in the normal array state, thereby ensuring the user's experience of using the audio device.

Figure 9:
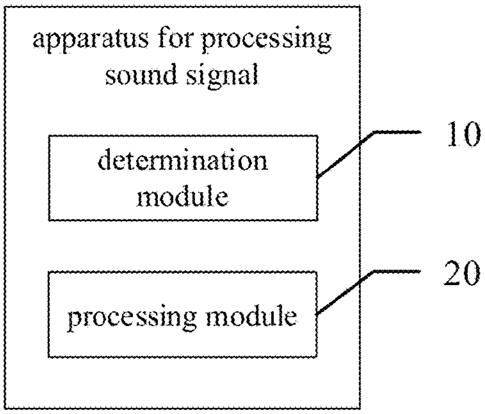
FIG. 9 is a schematic diagram of functional modules of the method for processing the sound signal according to an embodiment of the present application.

The present application further provides an apparatus for processing a sound signal, as shown in FIG. 9, the apparatus for processing a sound signal includes: a determination module 10 and a processing module 20.

The determination module 10 is configured to determine a current array state of a microphone array, the current array state represents whether the microphone in the microphone array is currently in a normal working state.

The processing module 20 is configured to call a target processing parameter in the current array state from signal processing parameters in multiple array states preset corresponding to a normal microphone to process a sound signal picked up by the normal microphone, the normal microphone is a microphone in a normal working state in the microphone array.

Furthermore, the processing module 20 is configured for:
calling a target gain parameter in the current array state from the gain parameters preset in multiple array states corresponding to the normal microphone performing the call function, and performing a gain process on the sound signal picked up by the normal microphone.

Furthermore, the processing module 20 is configured for:
calling a target filter parameter in the current array state from filter parameters in multiple array states preset corresponding to the normal microphone performing noise reduction function, and performing a noise reduction process on the sound signal picked up by the normal microphone.

Furthermore, the processing module 20 is configured for:
calling the target processing parameter in the current array state from the signal processing parameters in multiple array states preset corresponding to a function currently performed by the normal microphone, and performing a process corresponding to the function currently performed by the normal microphone on the sound signal picked up by the normal microphone.

Furthermore, the processing module 20 is configured for:
in response to detecting that the audio device is not in a call function, configuring the normal microphone as an active noise reduction microphone to perform an active noise reduction function, and
calling a target active noise reduction parameter in the current array state, and performing an active noise reduction process on the sound signal picked up by the active noise reduction microphone from active noise reduction parameters in multiple array states preset corresponding to the active noise reduction function of the active noise reduction microphone, the active noise reduction parameters are the filter parameters corresponding to the microphone performing the active noise reduction function.

Furthermore, the processing module 20 is configured for:
in response to detecting that the audio device is in a call state, configuring one of the normal microphones as a call microphone to perform a call function, and configuring another one of the normal microphones as an active noise reduction microphone to perform an active noise reduction function;
calling the target gain parameter in the current array state, and performing the gain process on the sound signal picked up by the call microphone from the gain parameters in the multiple array states preset corresponding to the call function of the call microphone; and
calling the target active noise reduction parameter in the current array state from the active noise reduction parameters in the multiple array states preset corresponding to the active noise reduction function of the active noise reduction microphone, and performing the active noise reduction process on the sound signal picked up by the active noise reduction microphone.

Furthermore, the determination module 10 is configured for:

obtaining an amplitude of the sound signal picked up by the microphone in the microphone array, and comparing the amplitude with a preset amplitude range;

in response to that the amplitude is not within the amplitude range, determining that the microphone in the microphone array is not in the normal working state;

in response to that the amplitude is within the amplitude range, determining that the microphone in the microphone array is in the normal working state; and determining the current array state of the microphone array according to whether the microphone in the microphone array is currently in the normal working state.

The various embodiments of the apparatus for processing a sound signal of the present application can refer to the various embodiments of the method for processing the sound signal of the present application, which will not be described in detail here.

In addition, an embodiment of the present application further provides an audio device, which includes a structural housing, a communication module, a main control module (such as a microcontroller unit (MCU)), a speaker, a microphone array, a memory, etc. The main control module may include a microprocessor, an audio decoding unit, a power supply and a power management unit, sensors required by the system, and other active or passive devices (which can be replaced, deleted or added according to actual functions) to realize the audio reception and playback functions. The audio device can establish a communication connection with the user terminal through the communication module. A program for processing a sound signal can be stored in the memory of the audio device, and the microprocessor can be configured to call the program for processing the sound signal stored in the memory and perform the following steps:

determining a current array state of the microphone array, the current array state represents whether a microphone in the microphone array is currently in a normal working state; and calling a target processing parameter in the current array state from signal processing parameters in multiple array states preset corresponding to a normal microphone to process a sound signal picked up by the normal microphone, the normal microphone is a microphone in a normal working state in the microphone array.

Furthermore, the step of calling the target processing parameters in the current array state from the signal processing parameters in the multiple array states preset corresponding to the normal microphones to process the sound signal picked up by the normal microphones includes:

calling a target gain parameter in the current array state from the gain parameters preset in multiple array states corresponding to the normal microphone performing the call function, and performing a gain process on the sound signal picked up by the normal microphone.

Furthermore, the step of calling the target processing parameter in the current array state from signal processing parameters in multiple array states preset corresponding to the normal microphone to process the sound signal picked up by the normal microphone includes:

calling a target filter parameter in the current array state from filter parameters in multiple array states preset corresponding to the normal microphone performing noise reduction function, and performing a noise reduction process on the sound signal picked up by the normal microphone.

Furthermore, the step of calling the target processing parameter in the current array state from signal processing parameters in multiple array states preset corresponding to the normal microphone to process the sound signal picked up by the normal microphone includes:

calling the target processing parameter in the current array state from the signal processing parameters in multiple array states preset corresponding to a function currently performed by the normal microphone, and performing a process corresponding to the function currently performed by the normal microphone on the sound signal picked up by the normal microphone.

Further, the step of calling the target processing parameter in the current array state from the signal processing parameters in multiple array states preset corresponding to the function currently performed by the normal microphone, and performing the process corresponding to the function currently performed by the normal microphone on the sound signal picked up by the normal microphone includes:

in response to detecting that the audio device is not in a call function, configuring the normal microphone as an active noise reduction microphone to perform an active noise reduction function; and calling a target active noise reduction parameter in the current array state, and performing an active noise reduction process on the sound signal picked up by the active noise reduction microphone from active noise reduction parameters in multiple array states preset corresponding to the active noise reduction function of the active noise reduction microphone, the active noise reduction parameters are the filter parameters corresponding to the microphone performing the active noise reduction function.

Further, the step of calling the target processing parameter in the current array state from the signal processing parameters in multiple array states preset corresponding to the function currently performed by the normal microphone, and performing the process corresponding to the function currently performed by the normal microphone on the sound signal picked up by the normal microphone includes:

in response to detecting that the audio device is in a call state, configuring one of the normal microphones as a call microphone to perform a call function, and configuring another one of the normal microphones as an active noise reduction microphone to perform an active noise reduction function;

calling the target gain parameter in the current array state, and performing the gain process on the sound signal picked up by the call microphone from the gain parameters in the multiple array states preset corresponding to the call function of the call microphone; and calling the target active noise reduction parameter in the current array state from the active noise reduction parameters in the multiple array states preset corresponding to the active noise reduction function of the active noise reduction microphone, and performing the active noise reduction process on the sound signal picked up by the active noise reduction microphone.

Further, the step of determining the current array state of the microphone array includes:

obtaining an amplitude of the sound signal picked up by the microphone in the microphone array, and comparing the amplitude with a preset amplitude range;

in response to that the amplitude is not within the amplitude range, determining that the microphone in the microphone array is not in the normal working state;

in response to that the amplitude is within the amplitude range, determining that the microphone in the microphone array is in the normal working state; and determining the current array state of the microphone array according to whether the microphone in the microphone array is currently in the normal working state.

The various embodiments of the audio device of the present application can refer to the various embodiments of the method for processing the sound signal of the present application, which will not be repeated here.

In addition, an embodiment of the present application further provides a computer-readable storage medium, on which a program for processing a sound signal is stored. When the program for processing the sound signal is executed by a processor, the steps of the method for processing the sound signal described above are implemented.

The various embodiments of the computer-readable storage medium of the present application can refer to the various embodiments of the method for processing the sound signal of the present application, which will not be repeated here.

It should be noted that, in this document, the terms "comprising", "comprises" or any other variations thereof are intended to cover a non-exclusive inclusion, such that a process, method, article or system that includes a series of elements not only includes those elements, it also includes other elements not expressly listed or inherent in the process, method, article or system. Without further limitation, an element defined by the statement "comprises a . . . " does not exclude the presence of additional identical elements in a process, method, article or system that includes that element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is better implementation. Based on this understanding, the technical solution of the present application can be embodied in the form of a software product in essence or the part that contributes to the existing technology. The computer software product is stored in a storage medium (such as read-only memory (ROM)/RAM, disk, compact disc (CD)), including several instructions to cause a terminal device (which can be a mobile phone, computer, server, air conditioner, or network device, etc.) to execute the methods described in various embodiments of the present application.

The above are only some embodiments of the present application, and intended to limit the scope of the present application. Any equivalent structural or process transformations made according to the description and drawings of the present application, or direct/indirect application in other related technical fields are included in the scope of the present application.

What is claimed is:

1. A method for processing a sound signal, applied to an audio device provided with a microphone array comprising at least two microphones, comprising:

determining a current array state of the microphone array, wherein the current array state represents whether a microphone in the microphone array is currently in a normal working state; and calling a target processing parameter in the current array state from signal processing parameters in multiple array states preset corresponding to a normal microphone to process a sound signal picked up by the normal microphone, wherein the normal microphone is a microphone in a normal working state in the microphone array, wherein the calling the target processing parameter in the current array state from signal processing parameters in multiple array states preset corresponding to the normal microphone to process the sound signal picked up by the normal microphone comprises:

calling the target processing parameter in the current array state from the signal processing parameters in multiple array states preset corresponding to a function currently performed by the normal microphone, and performing a process corresponding to the function currently performed by the normal microphone on the sound signal picked up by the normal microphone, and wherein the calling the target processing parameter in the current array state from the signal processing parameters in multiple array states preset corresponding to the function currently performed by the normal microphone, and performing the process corresponding to the function currently performed by the normal microphone on the sound signal picked up by the normal microphone comprises:

in response to detecting that the audio device is not in a call function, configuring the normal microphone as an active noise reduction microphone to perform an active noise reduction function; and calling a target active noise reduction parameter in the current array state, and performing an active noise reduction process on the sound signal picked up by the active noise reduction microphone from active noise reduction parameters in multiple array states preset corresponding to the active noise reduction function of the active noise reduction microphone, wherein the active noise reduction parameters are the filter parameters corresponding to the microphone performing the active noise reduction function.

2. The method according to claim 1, wherein the calling the target processing parameter in the current array state from signal processing parameters in multiple array states preset corresponding to the normal microphone to process the sound signal picked up by the normal microphone comprises:

calling a target gain parameter in the current array state from the gain parameters preset in multiple array states corresponding to the normal microphone performing the call function, and performing a gain process on the sound signal picked up by the normal microphone.

3. The method according to claim 1, wherein the calling the target processing parameter in the current array state from signal processing parameters in multiple array states preset corresponding to the normal microphone to process the sound signal picked up by the normal microphone comprises:

calling a target filter parameter in the current array state from filter parameters in multiple array states preset corresponding to the normal microphone performing noise reduction function, and performing a noise reduction process on the sound signal picked up by the normal microphone.

4. The method according to claim 1, wherein in response to that a quantity of the normal microphones is two, the calling the target processing parameter in the current array state from the signal processing parameters in multiple array states preset corresponding to the function currently performed by the normal microphone, and performing the process corresponding to the function currently performed by the normal microphone on the sound signal picked up by the normal microphone comprises:

in response to detecting that the audio device is in a call state, configuring one of the normal microphones as a call microphone to perform a call function, and configuring another one of the normal microphones as an active noise reduction microphone to perform an active noise reduction function;

calling the target gain parameter in the current array state, and performing the gain process on the sound signal picked up by the call microphone from the gain parameters in the multiple array states preset corresponding to the call function of the call microphone; and calling the target active noise reduction parameter in the current array state from the active noise reduction parameters in the multiple array states preset corresponding to the active noise reduction function of the active noise reduction microphone, and performing the active noise reduction process on the sound signal picked up by the active noise reduction microphone.

5. The method according to claim 1, wherein the determining the current array state of the microphone array comprises:

obtaining an amplitude of the sound signal picked up by the microphone in the microphone array, and comparing the amplitude with a preset amplitude range;

in response to that the amplitude is not within the amplitude range, determining that the microphone in the microphone array is not in the normal working state;

in response to that the amplitude is within the amplitude range, determining that the microphone in the microphone array is in the normal working state; and determining the current array state of the microphone array according to whether the microphone in the microphone array is currently in the normal working state.

6. An audio device, comprising:

a memory;

a processor; and a program for processing a sound signal stored in the memory and executable on the processor, wherein the program for processing the sound signal is configured to implement the method according to claim 1.

7. A non-transitory computer-readable storage medium, wherein a program for processing a sound signal is stored in the storage medium, and when the program for processing the sound signal is executed by a processor, the method according to claim 1 is implemented.

* * * * *